(12) United States Patent
Cochran et al.

(10) Patent No.: US 8,107,093 B2
(45) Date of Patent: Jan. 31, 2012

(54) USING GEOMETRY BOUNDS TO ENABLE SCALE PRINTING OF VIRTUAL PAPER ONTO PHYSICAL PAPER WHEN USING A PRINTER WITH A DIFFERING PRINTABLE AREA

(75) Inventors: Benjamin D. Cochran, San Rafael, CA (US); Brian P. Mathews, San Francisco, CA (US)

(73) Assignee: Autodesk, Inc., San Rafael, CA (US)

( * ) Notice: Subject to any disclaimer, the term of this patent is extended or adjusted under 35 U.S.C. 154(b) by 1528 days.

(21) Appl. No.: 11/125,388

(22) Filed: May 9, 2005

(65) Prior Publication Data

US 2006/0250621 A1 Nov. 9, 2006

(51) Int. Cl.
*G06F 15/00* (2006.01)

(52) U.S. Cl. ...... 358/1.13; 358/1.2; 358/1.15; 358/1.18; 345/660; 345/668

(58) Field of Classification Search .................. 358/1.13, 358/1.2, 1.15, 1.18; 345/660, 668
See application file for complete search history.

(56) References Cited

U.S. PATENT DOCUMENTS

| 5,260,805 | A | * | 11/1993 | Barrett | 358/449 |
| 5,485,554 | A | * | 1/1996 | Lowitz et al. | 358/1.17 |
| 5,551,160 | A | * | 9/1996 | Ferris et al. | 33/452 |
| 6,414,698 | B1 | * | 7/2002 | Lovell et al. | 715/800 |
| 6,714,692 | B1 | * | 3/2004 | Kim et al. | 382/299 |
| 6,738,154 | B1 | * | 5/2004 | Venable | 358/1.15 |
| 7,212,309 | B1 | * | 5/2007 | Sellers et al. | 358/1.2 |
| 2003/0028560 | A1 | * | 2/2003 | Kudrolli et al. | 707/509 |
| 2003/0226113 | A1 | * | 12/2003 | Altman et al. | 715/520 |
| 2004/0207875 | A1 | * | 10/2004 | Endo | 358/1.18 |
| 2005/0041871 | A1 | * | 2/2005 | Abe | 382/199 |
| 2005/0225779 | A1 | * | 10/2005 | Kubota | 358/1.2 |

* cited by examiner

*Primary Examiner* — Mark K Zimmerman
*Assistant Examiner* — Mark Milia
(74) *Attorney, Agent, or Firm* — Gates & Cooper LLP

(57) ABSTRACT

A computer-implemented graphics program that correctly adapts images being printed to the physical capabilities of a printer. A published virtual paper is scaled to a physical paper, taking into account the virtual paper's size, geometry bounds for an image from the virtual paper being printed, balanced geometry bounds calculated from the geometry bounds, the physical paper's size and a printable area of the physical paper, so that the image being printed fits within a printable area of the physical paper.

24 Claims, 5 Drawing Sheets

USING GEOMETRY BOUNDS TO ENABLE SCALE PRINTING OF VIRTUAL PAPER ONTO PHYSICAL PAPER WHEN USING A PRINTER WITH A DIFFERING PRINTABLE AREA

BACKGROUND OF THE INVENTION

1. Field of the Invention

The present invention relates generally to graphics programs, and in particular, to a printing in a graphics program.

2. Description of the Related Art

Engineering, architecture and the like are all intrinsically collaborative processes. However, the costs of sharing printed design documents can be quite expensive. An alternative method that has been gaining popularity in recent years is to share design documents using electronic paper formats such as TIFF, JPEG, CALS, HPGL, and PDF. The drawback is that these electronic paper formats cannot capture the intelligence within a design, and may not be capable of printing accurate copies of the design documents, due to the use of different printers by various participants to the collaborative process.

Accordingly, what is needed are automated tools for accurately printing design documents. Specifically, there is a need in the art for a set of tools for use with computer-implemented graphics programs that assists users in publishing accurate drawings.

SUMMARY OF THE INVENTION

To address the requirements described above, the present invention discloses a method, apparatus, and article of manufacture that correctly adapts images being printed to the physical capabilities of a printer. A published virtual paper is scaled to a physical paper, taking into account the virtual paper's size, geometry bounds for an image from the virtual paper being printed, balanced geometry bounds calculated from the geometry bounds, the physical paper's size and a printable area of the physical paper, so that the image being printed fits within a printable area of the physical paper.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

Scaling a published virtual paper to physical paper, so that an image of the virtual paper fits inside a printable area of the physical paper, can be difficult, because every printer has slightly different physical capabilities. The present invention provides a method for adapting the virtual paper to the physical capabilities of the printer. The present invention provides the best scale while not clipping the image, and takes into account the virtual paper size, the geometry bounds, the physical paper size and the printable area of the physical paper.

Hardware and Software Environment

Figure 1:
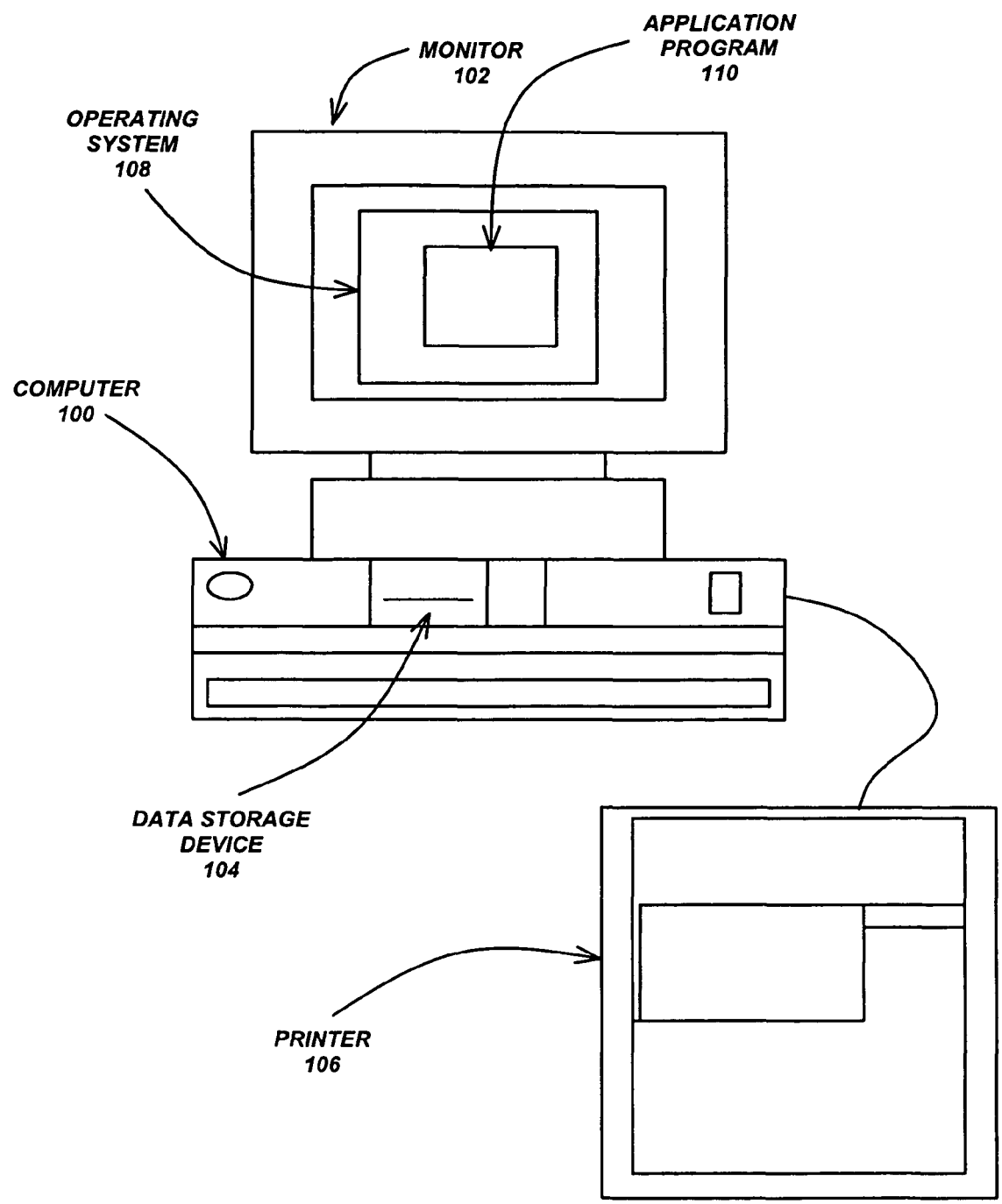
FIG. 1 is an exemplary hardware and software environment used to implement a preferred embodiment of the present invention.

FIG. 1 is an exemplary hardware and software environment used to implement a preferred embodiment of the present invention. The preferred embodiment of the present invention may be implemented using a computer 100, which generally includes, inter alia, a monitor 102 or other display device, one or more data storage devices 104, a printer 106, and any number of other devices. Those skilled in the art will recognize that any combination of the above components, or any number of different components, peripherals, and other devices, may be used with the computer 100.

The computer 100 operates under the control of an operating system 108, which is represented by a window displayed on the monitor 102. The operating system 108, in turn, controls the operation of one or more application programs 110, which is also represented by a window displayed on the monitor 102. The preferred embodiment of the present invention is implemented in the application program 110, although it may be implemented in the operating system 110.

Generally, both the operating system 108 and application program 110 comprise instructions and/or data that are embodied in or readable from a device, media, carrier, or signal, e.g., one or more fixed and/or removable data storage devices 104 connected directly or indirectly to the computer 100, one or more remote devices coupled to the computer 100 via a data communications device, etc. Moreover, these instructions and/or data, when read, executed, and/or interpreted by the computer 100, cause the computer 100 to perform the logic necessary to implement and/or use the present invention.

Thus, the present invention may be implemented as a method, apparatus, or article of manufacture using standard programming and/or engineering techniques to produce software, firmware, hardware, or any combination thereof. The term "article of manufacture", or alternatively, "computer program carrier", as used herein is intended to encompass instructions and/or data accessible from any computer-readable device, media, carrier or signal Of course, those skilled in the art will recognize many modifications may be made to this configuration without departing from the scope of the present invention. Specifically, those skilled in the art will recognize that the exemplary environment illustrated in FIG. 1 is not intended to limit the present invention. Indeed, those skilled in the art will recognize that other alternative environments may be used without departing from the scope of the present invention.

Application Program

Figure 2:
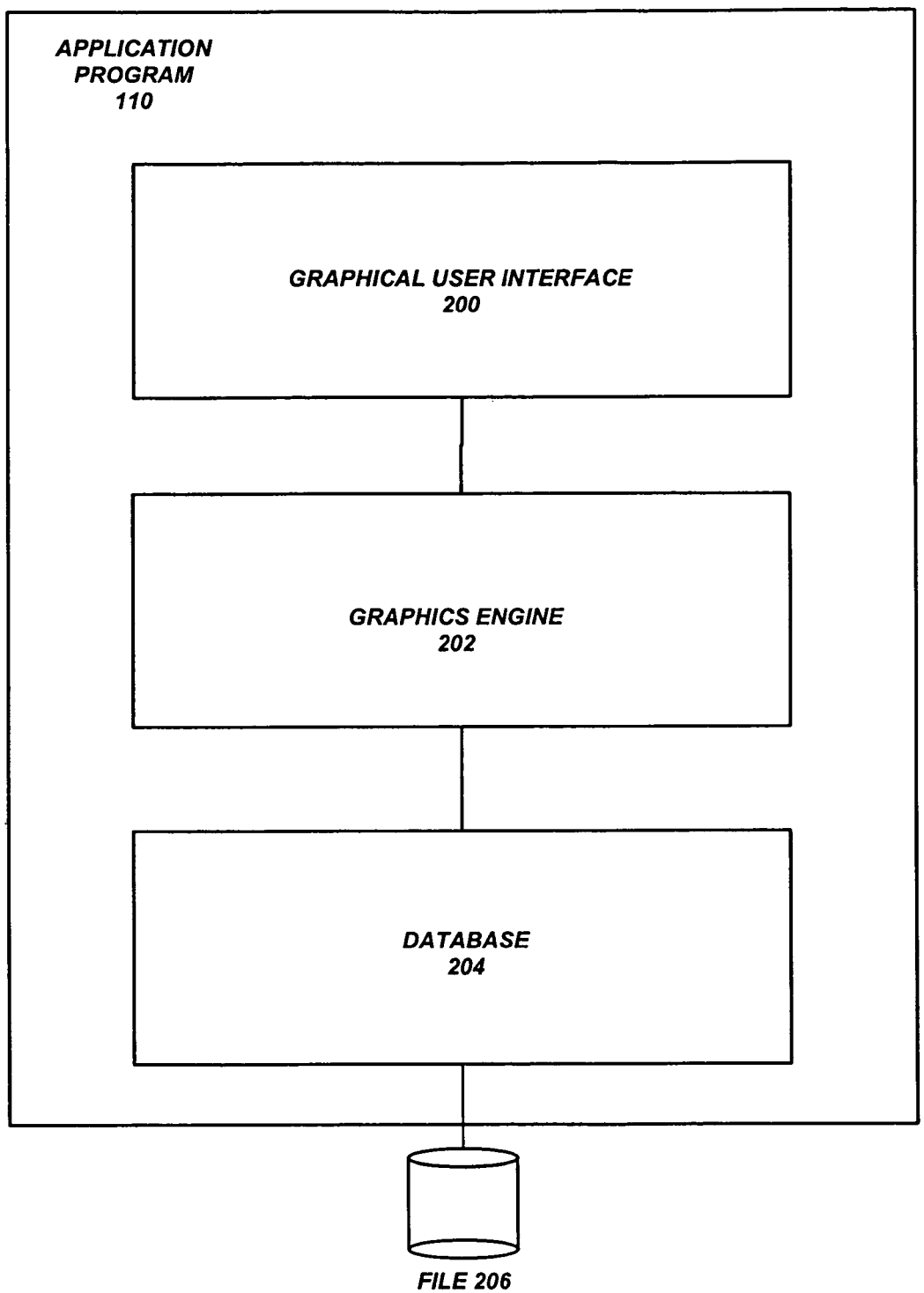
FIG. 2 is a block diagram that illustrates the components of the application program in accordance with a preferred embodiment of the present invention.

FIG. 2 is a block diagram that illustrates the components of the application program 110 in accordance with a preferred embodiment of the present invention. Preferably, the application program 110 comprises a graphics or drafting program, such as the DWF (Design Web Format) Viewer™ product provided by AUTODESK, INC., the assignee of the present invention.

In this embodiment, the DWF Viewer 110 includes a Graphical User Interface 200, an Engine 202, and a DataBase 204 for storing data in one or more DWF Files 206. Those skilled in the art will recognize that the application program 110 may include other or different components while still embodying the present invention.

The Graphical User Interface 200 displays information to the operator and provides the functionality for the operator's interaction with the application program 110. The Engine 202 processes the data stored in the DWF File 206 and delivers the results to the Graphical User Interface 200 for display on the monitor 102. The DataBase 204 stores data, such as graphical, textual or other data, retrieved from the DWF File 206.

Preferably, the DWF File 206 may be comprised of three-dimensional (3D) data known as the "3D world space," and/or two-dimensional (2D) data, known as drawings, layouts or views.

With regard to the 3D data, an object or collection of objects in the 3D world space is often referred to as a "model." Consequently, the 3D world space in which a model resides is referred to as a model space.

With regard to the 2D data, drawings and layouts are created in a 2D space, and thus are displayed in that 2D space. However, views store 2D data derived from the 3D data. For example, a user may desire to view the model in the model space from various perspectives (e.g., a top view, right and left side views, bottom view, etc.). To view the model in the model space, a user defines and creates one or more views that include one or more 2D viewports. A viewport is a bounded area that displays some portion of the model space of the model. Multiple viewports may be used to provide different views of the model.

Operation of the DWF Viewer

The DWF Viewer 110 allows users to view and print images (e.g., geometry) found within a "published" DWF file 206, and thus uses the same printing and rendering engines as AUTODESK's design products. The DWF Viewer 110 provides full visual and print fidelity for designs and drawings, and enables users to print accurate engineering, architectural and other designs to an original scale or specified scale.

DWF is a file format used for published design information. DWF was specifically developed by AUTODESK as a medium for engineers, architects and other professionals to quickly capture and securely distribute rich design data anywhere it is needed.

DWF is an open, compact and secure standard that enables the efficient distribution of rich design data to anyone who needs it. DWF protects the integrity of the designs, and allows for the precise publishing, rendering and printing of even the most complex 2D and/or 3D designs and models.

Fitting an Image to Physical Paper

When a DWF file 206 is created, the publisher does not know where (and on what kind of printer 106) it will be printed. Thus, there is a need to take into account certain factors of the image as well as the printer 106, in order to print to scale on all printers 106.

The DWF Viewer 110 knows the virtual paper size, that the user has selected print-to-scale, and the physical paper size and margins of the printer 106, i.e., the printable area of the printer 106.

Figure 3:
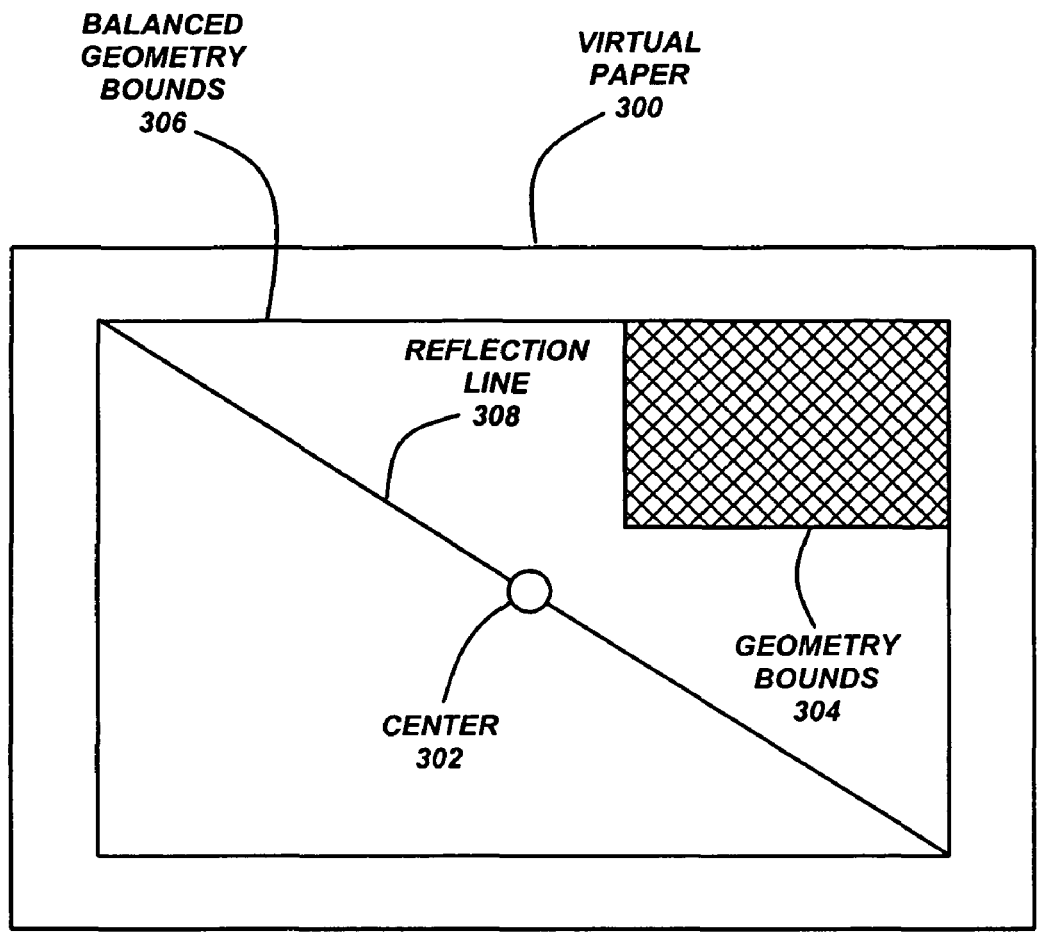
FIG. 3 is a block diagram that illustrates the factors used by the application program when printing an image according to the preferred embodiment of the present invention.

Several factors are considered when calculating the scale used by the DWF Viewer 110 during the printing of an image from the DWF file 206. These factors are illustrated in FIG. 3, and comprise the extents of the virtual paper 300, the center 302 of the virtual paper 300, the geometry bounds 304, the balanced geometry bounds 306, and the reflection line 308.

When viewing the DWF file 206, the viewport is the virtual paper 300. When printing the viewport, the virtual paper 300 size is simply typically positioned and scaled to the physical paper size and margins of the printer 106.

When the DWF Viewer 110 is printing a published page from the DWF file 206, the virtual paper 300 size is simply the paper size published to the DWF file 206. The virtual paper 300 is typically positioned within the physical paper size, often times matching the physical paper size, and only as a last resort is the virtual paper 300 positioned inside the printable area of the printer 106.

In both instances, the geometry bounds 304 are the bounds that fit tightly around the image being printed from the DWF file 206.

Figure 4:
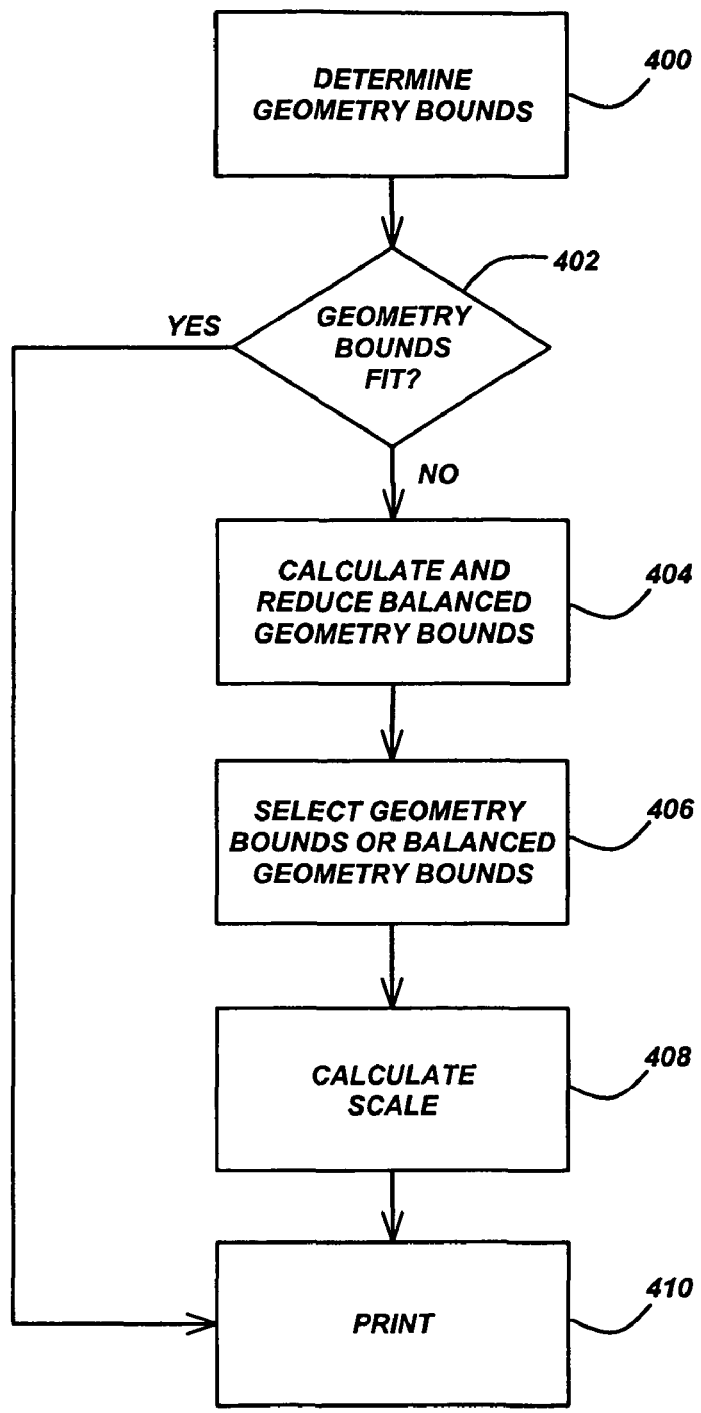
FIG. 4 is a flowchart that illustrates the general logic of the application program when performing the steps of the preferred embodiment of the present invention.

FIG. 4 is a flowchart that illustrates the general logic of the DWF Viewer 110 when performing the steps of the preferred embodiment of the present invention.

Block 400 represents the DWF Viewer 110 determining the geometry bounds 304.

Block 402 is a decision block that represents the DWF Viewer 110 determining whether the geometry bounds 304 fit within the printable area at the desired scale, wherein the placement of the geometry within the bounds 304 may even be shifted, if necessary, to ensure that it fits within the printable area. If so, control transfers to Block 410, where the DWF Viewer 110 prints from the DWF file 206.

However, if the geometry bounds 304 do not fit within the printable area at the desired scale, then there are problems. The goal is to solve these problems, without clipping the geometry and still printing at the desired scale. In such a situation, control transfers to Block 404.

Block 404 represents the DWF Viewer 110 calculating and reducing the balanced geometry bounds 306.

The balanced geometry bounds 306 are an adjusted version of the geometry bounds 304, and are used to preserve the intent of the publisher. For example, in some cases, the geometry bounds 304 are not balanced on the virtual paper 300. The balanced geometry bounds 306 are calculated by reflecting the point of the geometry bounds 304 that is farthest from the center 302 of the virtual paper 300 across the center 302 of the virtual paper 300. The geometry within the bounds 306 may also be shifted, if necessary, to ensure they are within the virtual paper 300.

The balanced geometry bounds 306 are then reduced by a reasonable factor, e.g., 2-6%, to ensure that the balanced geometry bounds 306 fit within the printable area of the physical paper, to ensure that the balanced geometry bounds 306 are not outside the boundaries of the virtual paper 300, and to determine whether the balanced geometry bounds 306 are within the geometry bounds 304. However, other factors can also be used. Reducing the balanced geometry bounds 306 in this manner allows an image from the DWF file 206 that is placed outside of the printable area of the physical paper, but fits inside of the printable area, to be scaled at 100%. Creating the reduced balanced geometry bounds 306 and then ensuring the reduced bounds 306 is larger then the actual bounds 304 is a way of shifting the geometry in a way that is acceptable (or not noticeable) to the user.

Block 406 represents the DWF Viewer 110 selecting either the geometry bounds or the reduced balanced geometry bounds 306.

If the reduced balanced geometry bounds 306 are inside the original geometry bounds 304, then the reduced balanced geometry bounds 306 are not used and the original geometry bounds 304 are used. On the other hand, if the reduced balanced geometry bounds 306 are outside the original geometry bounds 304, then the balanced geometry bounds 306 are used.

Block 408 represents the DWF Viewer 110 calculating a scale for use in printing. The logic of this calculation is further described in FIG. 5, which is set forth below.

Finally, Block 410 represents the DWF Viewer 110 printing from the DWF file 206.

Figure 5:
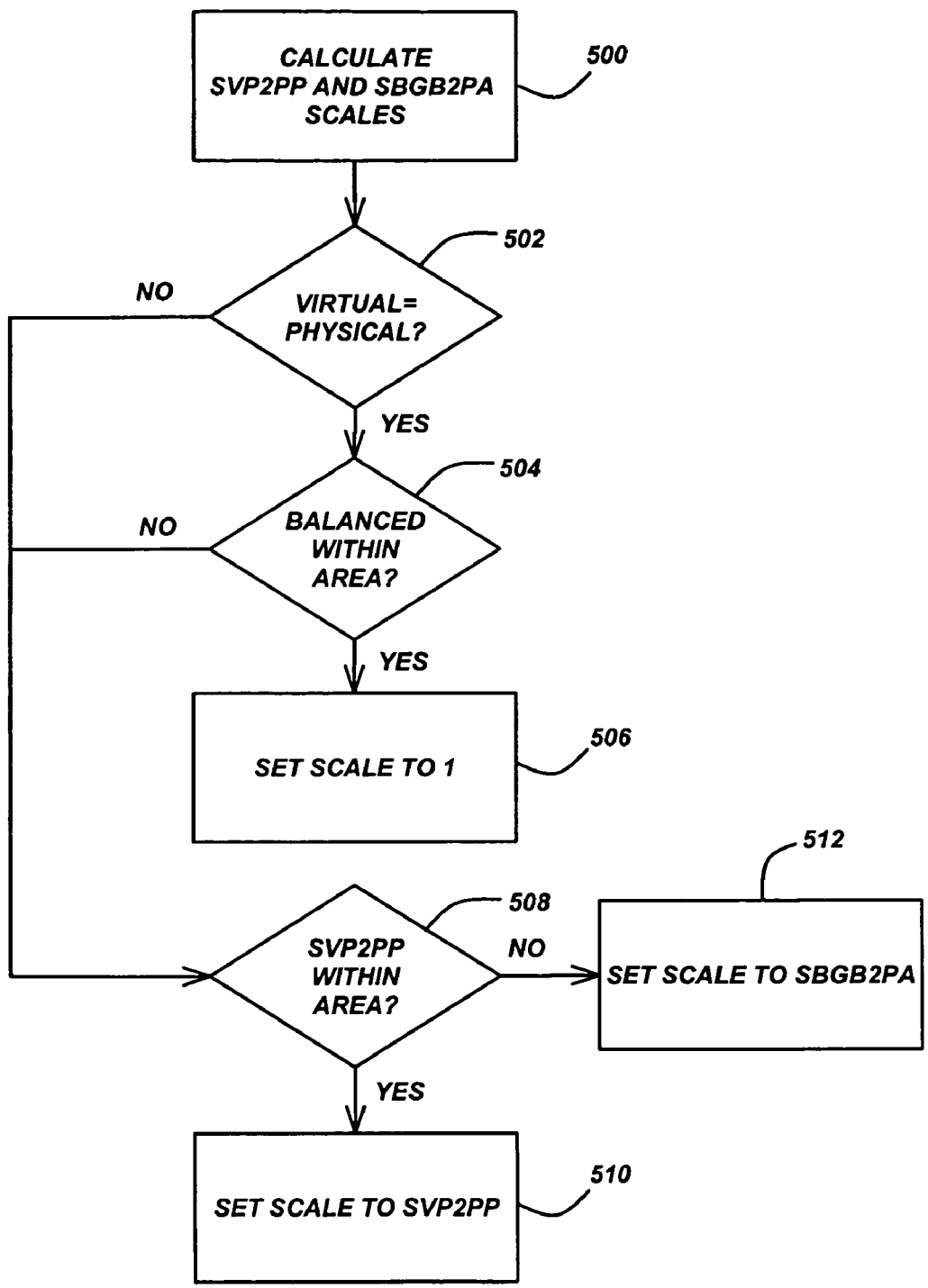
FIG. 5 is a flowchart that illustrates the specific logic of the application program when calculating a scale according to the preferred embodiment of the present invention.

FIG. 5 is a flowchart that illustrates the specific logic of the DWF Viewer 110 when calculating a scale according to the preferred embodiment of the present invention.

Block 500 represents the DWF Viewer 110 calculating two scales: a "virtual paper to physical paper" scale (SVP2PP) and a "balanced geometry bounds to printable area" scale (SBGB2PA). The scale that is used is determined based on the following logic.

Block 502 is a decision block that represents the DWF Viewer 110 determining whether the virtual paper 300 size is the same as the physical paper size of the printer 106. If so, control transfers to Block 504; otherwise, control transfers to Block 508.

Block 504 is a decision block that represents the DWF Viewer 110 determining whether the balanced geometry bounds 306 fits inside the printable area of the physical paper. If so, control transfers to Block 506; otherwise, control transfers to Block 508.

Block 506 represents the DWF Viewer 110 setting the scale to 1.00, and the logic returns to FIG. 4.

Block 508 is a decision block that represents the DWF Viewer 110 determining whether the balanced geometry bounds 306 scaled by SVP2PP fits within the printable area of the physical paper. If so, control transfers to Block 510; otherwise, control transfers to Block 512.

Block 510 represents the DWF Viewer 110 setting the scale to SVP2PP, and the logic returns to FIG. 4.

Block 512 represents the DWF Viewer 110 setting the scale to SBGBP2PA, and the logic returns to FIG. 4.

CONCLUSION

This concludes the description of the preferred embodiment of the invention. The following describes some alternative embodiments for accomplishing the present invention.

For example, any type of computer could be used with the present invention. Moreover, any type of software could benefit from the present invention. Further, other file formats could be used in place of that described in the preferred embodiment without departing from the scope of the present invention. Finally, different sequences of steps or logic could be used in place of those found in the preferred embodiment without departing from the scope of the present invention.

The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for operating a graphics program in a computer, comprising:
   selecting, in a computer, an image from a virtual paper for printing;
   scaling, in the computer, the image from the virtual paper to fit a printable area of a physical paper without clipping the image, by automatically selecting between a geometry bounds and a balanced geometry bounds for the image, depending on whether the balanced geometry bounds are within the geometry bounds, wherein the geometry bounds are automatically determined to fit around the image, and the balanced geometry bounds are automatically calculated by reflecting a point of the geometry bounds that is farthest from a center of the virtual paper across the center of the virtual paper and then the balanced geometry bounds are automatically reduced to ensure that the balanced geometry bounds are not outside the virtual paper's boundaries; and
   printing, in the computer, the image within the printable area of the physical paper using either the geometry bounds or the balanced geometry bounds.

2. The method of claim 1, wherein the scaling step comprises scaling the virtual paper while not clipping the image.

3. The method of claim 1, wherein the balanced geometry bounds are reduced such that—the balanced geometry bounds fit within the printable area of the physical paper.

4. The method of claim 3, wherein, if the reduced balanced geometry bounds are within the geometry bounds, then the image is printed using the geometry bounds.

5. The method of claim 3, wherein, if the reduced balanced geometry bounds are outside the geometry bounds, then the image is printed using the balanced geometry bounds.

6. The method of claim 1, wherein, when the virtual paper's size is the same as the physical paper's size, and the printable area of the physical paper fits within the balanced geometry bounds, then printing with a scale set to 1.00.

7. The method of claim 1, wherein, when the balanced geometry bounds scaled by a "virtual paper to physical paper" (SVP2PP) scale fits within the printable area of the physical paper, then printing with a scale set to SVP2PP.

8. The method of claim 1, wherein, when the balanced geometry bounds scaled by a "virtual paper to physical paper" (SVP2PP) scale does not fit within the printable area of the physical paper, then printing with a scale set to a "balanced geometry bounds to printable area" (SBGB2PA) scale.

9. An apparatus for operating a graphics program in a computer, comprising:
   a graphics program, executed by the computer, for selecting an image from a virtual paper for printing; for scaling the image from the virtual paper to fit a printable area of a physical paper without clipping the image, by automatically selecting between a geometry bounds and a balanced geometry bounds for the image, depending on whether the balanced geometry bounds are within the geometry bounds, wherein the geometry bounds are automatically determined to fit around the image, and the balanced geometry bounds are automatically calculated by reflecting a point of the geometry bounds that is farthest from a center of the virtual paper across the center of the virtual paper and then the balanced geometry bounds are automatically reduced to ensure that the balanced geometry bounds are not outside the virtual paper's boundaries; and for printing the image within the printable area of the physical paper using either the geometry bounds or the balanced geometry bounds.

10. The apparatus of claim 9, wherein the scaling performed by the graphics program comprises scaling the virtual paper while not clipping the image.

11. The apparatus of claim 9, wherein the balanced geometry bounds are reduced such that the balanced geometry bounds fit within the printable area of the physical paper.

12. The apparatus of claim 11, wherein, if the reduced balanced geometry bounds are within the geometry bounds, then the image is printed using the geometry bounds.

13. The apparatus of claim 11, wherein, if the reduced balanced geometry bounds are outside the geometry bounds, then the image is printed using the balanced geometry bounds.

14. The apparatus of claim 9, wherein, when the virtual paper's size is the same as the physical paper's size, and the printable area of the physical paper fits within the balanced geometry bounds, then printing with a scale set to 1.00.

15. The apparatus of claim 9, wherein, when the balanced geometry bounds scaled by a "virtual paper to physical paper" (SVP2PP) scale fits within the printable area of the physical paper, then printing with a scale set to SVP2PP.

16. The apparatus of claim 9, wherein, when the balanced geometry bounds scaled by a "virtual paper to physical paper" (SVP2PP) scale does not fit within the printable area of the physical paper, then printing with a scale set to a "balanced geometry bounds to printable area" (SBGB2PA) scale.

17. An article of manufacture that is non-transitory embodying logic for operating a graphics program in a computer, the logic comprising:
   selecting, in a computer, an image from a virtual paper for printing;
   scaling, in the computer, the image from the virtual paper to fit a printable area of a physical paper without clipping the image, by automatically selecting between a geometry bounds and a balanced geometry bounds for the image, depending on whether the balanced geometry bounds are within the geometry bounds, wherein the geometry bounds are automatically determined to fit around the image, and the balanced geometry bounds are automatically calculated by reflecting a point of the geometry bounds that is farthest from a center of the virtual paper across the center of the virtual paper and then the balanced geometry bounds are automatically reduced to ensure that the balanced geometry bounds are not outside the virtual paper's boundaries; and
   printing, in the computer, the image within the printable area of the physical paper using either the geometry bounds or the balanced geometry bounds.

18. The article of claim 17, wherein the scaling step comprises scaling the virtual paper while not clipping the image.

19. The article of claim 17, wherein the balanced geometry bounds are reduced such that the balanced geometry bounds fit within the printable area of the physical paper.

20. The article of claim 19, wherein, if the reduced balanced geometry bounds are within the geometry bounds, then the image is printed using the geometry bounds.

21. The article of claim 19, wherein, if the reduced balanced geometry bounds are outside the geometry bounds, then the image is printed using the balanced geometry bounds.

22. The article of claim 17, wherein, when the virtual paper's size is the same as the physical paper's size, and the printable area of the physical paper fits within the balanced geometry bounds, then printing with a scale set to 1.00.

23. The article of claim 17, wherein, when the balanced geometry bounds scaled by a "virtual paper to physical paper" (SVP2PP) scale fits within the printable area of the physical paper, then printing with a scale set to SVP2PP.

24. The article of claim 17, wherein, when the balanced geometry bounds scaled by a "virtual paper to physical paper" (SVP2PP) scale does not fit within the printable area of the physical paper, then printing with a scale set to a "balanced geometry bounds to printable area" (SBGB2PA) scale.

* * * * *